Dec. 20, 1960 G. R. PURIFOY 2,965,825

TRACTION-MOTOR CONTROL

Filed Feb. 27, 1957 3 Sheets-Sheet 1

Dec. 20, 1960 G. R. PURIFOY 2,965,825

TRACTION-MOTOR CONTROL

Filed Feb. 27, 1957 3 Sheets-Sheet 2

(Rest as in Figs. 1A and 1B.)

(Rest as in Figs. 1A and 1B.)

(Rest as in Figs. 1A and 1B.)

2,965,825
Patented Dec. 20, 1960

2,965,825

TRACTION-MOTOR CONTROL

George R. Purifoy, Forest Hills, Pa., assignor to Westinghouse Electric Corporation, East Pittsburgh, Pa., a corporation of Pennsylvania Filed Feb. 27, 1957, Ser. No. 642,742
7 Claims. (Cl. 318—93)

My invention relates to a control-assembly for two series-motor means for a common load-device such as an electrically propelled vehicle, and it has particular relation to an electrical control-system of the type which is used on rapid-transit cars.

My invention relates to various improvements for obtaining smooth operation during both motoring and dynamic braking.

These improvements include the use of staggered or alternate notching or switching-operations of two accelerating resistance in two motor-circuits, during both acceleration and braking, in combination with a current-rate response, or other kick-impulse means, for the limit-relay, in response to current-changes in each motor-circuit, preferably with means for variably controlling the strength of the transient response, relative to the steady-current response, during different operating-conditions, to take care of such different requirements as are obtained during shunted-field operation and the different requirements of motoring and braking.

My improvements also include a relay which I call a door-brake relay, which has several advantages connected with the maintenance of the energization of the brake-protective relay during special operating-conditions of the car or train which is being controlled.

My improvements also include a means for releasing the dynamic braking after a partial brake-application, with means for killing or inactivating this brake-release until a substantial portion of the common-braking-circuit resistance has been cut out, thereby insuring smooth or comfortable operation.

Figure 1A:
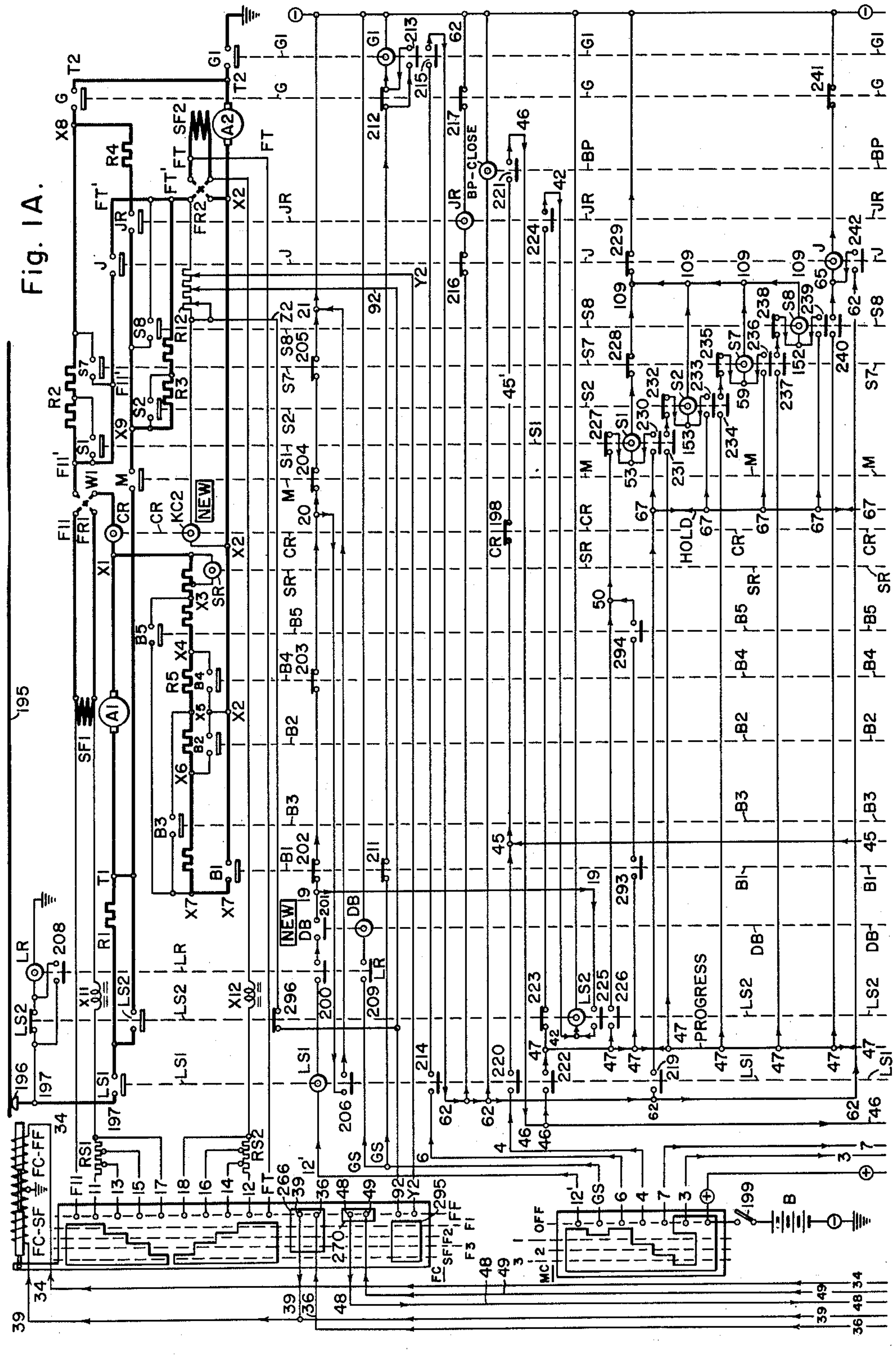
Figure 1B:
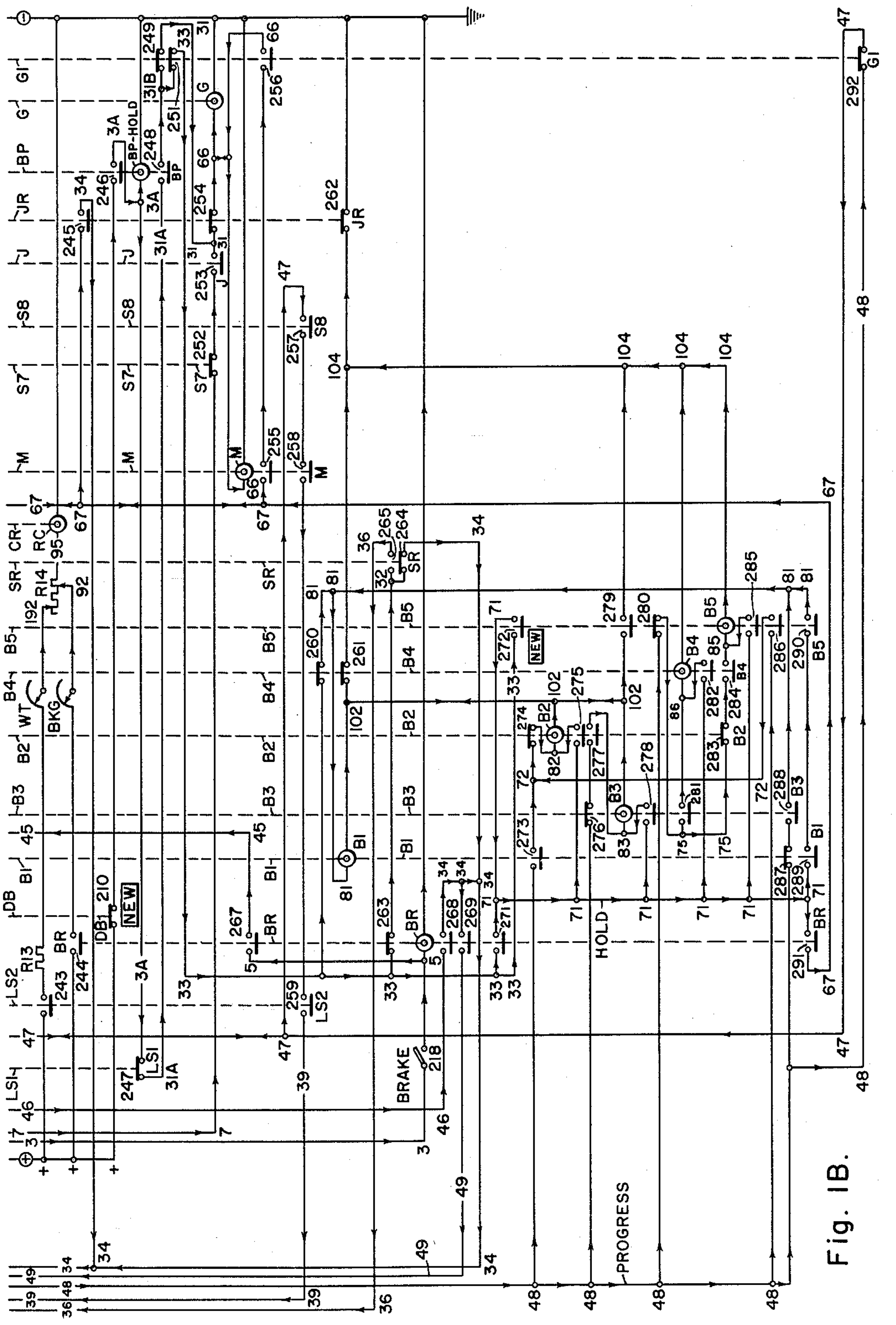
Figure 2:
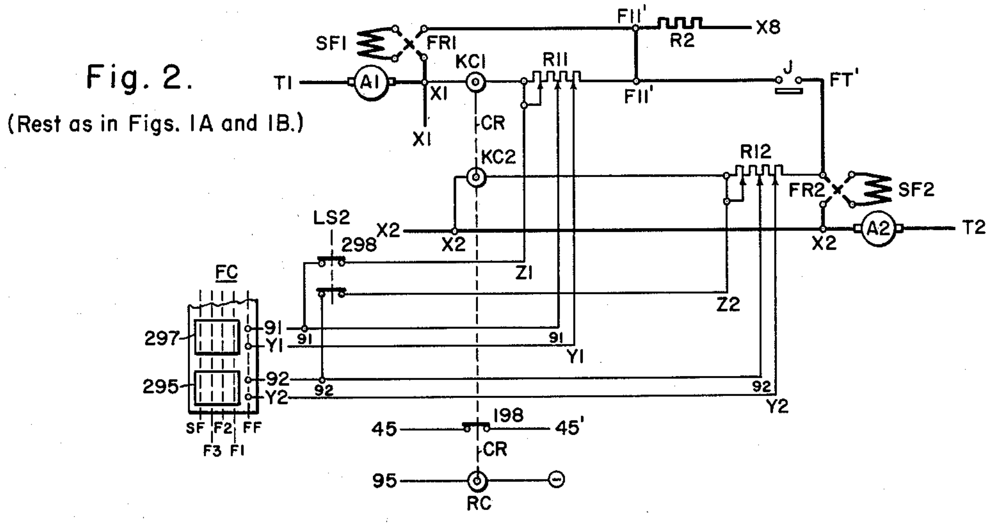
Figure 3:
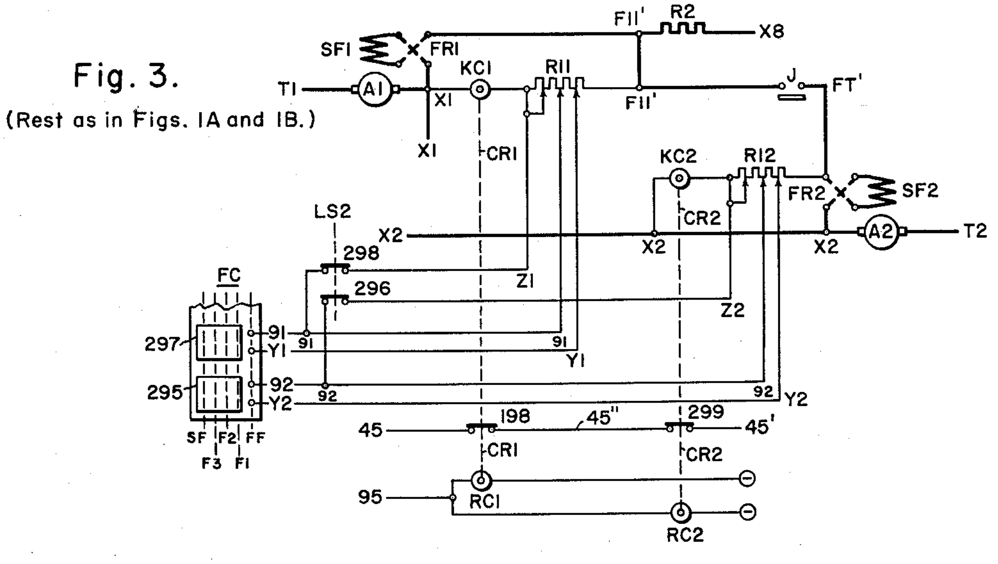
Figure 4:
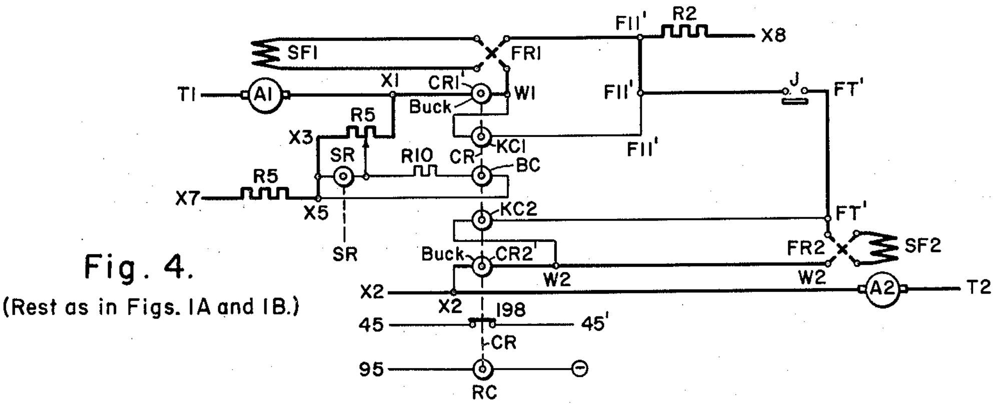

With the foregoing and other objects in view, my invention consists in the circuits, systems, apparatus, combinations, parts, and methods of design and operation, hereinafter described, and illustrated in the accompanying drawing, wherein Figures 1A and 1B together constitute a simplified circuit-diagram of the parts, of one car, which are necessary to illustrate my present invention, omitting many parts which are known to be needed in a successful railway-control equipment of the type to which my invention is applied, but which are not necessary to be discussed in setting forth the nature and operation of my present improvements; while Figs. 2, 3 and 4, are partial diagrammatic views showing modifications of portions of Figs. 1A and 1B.

Figs. 1A and 1B represent some of the equipment which is carried by a single electrically propelled railway-car embodying my invention. Direct-current power is supplied to the car from a third rail 195, or a trolley wire, which is engaged by a third-rail shoe 196, or by a trolley pole, pantograph, or other current-collecting equipment, carried by the car. The third-rail shoe 196 energizes a line 197 which constitutes a supply-circuit for the car.

The traction-motors for the car are direct-current series motors, which are shown in Fig. 1A, by way of a simple example, as comprising two motor-armatures A1 and A2, each being associated with its own series field winding SF1 and SF2, respectively. Two direct-current series-motor means, or circuits, are shown. The first series-motor means comprises, in series, an armature-terminal T1, a motor-armature or armatures A1, an intermediate connection-point X1, a series relay-coil CR of a limit-relay which is also designated CR, a connection-point W1, a field-reverser FR1, a series main-field winding or windings SF1 for supplying the field-excitation for said armature or armatures A1, a field-terminal F11, the field-reverser FR1 again, and an auxiliary field-terminal F11'. The corresponding parts for the second series-motor means are indicated at T2, A2, X2, FR2, SF2, FT, FR2 again, and FT', noting that the series relay-coil CR is not present in this second series-motor means.

A series-parallel motor-control arrangement is shown in Fig. 1A, in which a line-switch LS1 and a ground-switch G1 are used as power-switch means for establishing a power-circuit for energizing the motors, by connecting the first armature-terminal T1 to the supply-circuit 197, and connecting the second armature-terminal T2 to ground. For completing the series-circuit connections, a series-motor switch JR is closed in addition to the power-switches LS1 and G1. For parallel-motor operation, two parallel-motor switches M and G are closed in addition to the power-switches LS1 and G1. The parallel-motor switch M provides a circuit-connection between the armature-terminal T1 of one series-motor means and the auxiliary-field-terminal FT' of the other series-motor means; while the other parallel-motor switch G provides a circuit-connection between the other armature-terminal T2 and the other auxiliary field terminal F11'. During an intermediate transition-period, a transition-switch J is closed. These motor-controlling connections are all in accordance with a well-known switching-system.

A suitable number of series-connected accelerating resistances are used, as indicated at R1, R2, R3 and R4. The resistance R1 is disposed between the supply-line 197 and the first armature-terminal T1, and this resistance R1 is shorted out by means of a second line-switch LS2. The resistance R2 is in series between the first auxiliary field-terminal F11' and an intermediate connection-point X8, and this resistance R2 is progressively reduced or shorted out by means of any desired number of switch-contacts, of which only S1 and S7 are shown. The resistance R3 is in series between the second auxiliary field-terminal FT' and an intermediate connection-point X9, and this resistance R3 is progressively reduced or shorted out by any desired number of switch-contacts, of which only S2 and S8 are shown. The resistance R4 is in the series-motor connection which is made between the points X8 and X9 by the switch JR, and this resistance R4 is finally shorted out by a transition-switch J, which makes a connection between the auxiliary field-terminals F11' and FT', for obtaining the full-series power-circuit connection of the motors.

Dynamic-braking circuits are established by opening the two power-switches LS1 and G1, and closing a braking-switch B1 in addition to the two parallel-connection switches M and G, also in accordance with a well-known system or arrangement. The braking-switch B1 provides a common dynamic-braking circuit-connection X3, X4, X5, X6, X7 between the respective intermediate connection-points X1 and X2 of the two series-motor means, thus providing two dynamic-braking circuits wherein the motor-armature or armatures of each of said series-motor means are loaded by the field winding or windings of the other one of said series-motor means, in series with one of the accelerating resistances R2 or R3.

During both series and parallel motor operation, and also during dynamic braking, the switch-contacts S1, S2, S7 and S8 are successively or progressively closed, in what is known as alternate progression, first in one motor-circuit and then the other. During parallel motor operation, after all of the accelerating-resistances R2 and R3 have been cut out, the field-strengths of the motors are progressively reduced, to provide shunted-field operating-conditions.

In accordance with a usual arrangement, the motor-fields are reduced by equipping each of the series field windings SF1 and SF2 with a field-shunt, comprising an inductive reactor X11 or X12, as the case may be, and a variable resistor RS1 or RS2, respectively. The field-shunts X11—RS1 and X12—RS2 are first connected in parallel relation to their respective field-windings SF1 and SF2, by means of contact-terminals 11 and 12, respectively, of a progressively or sequentially operating field-controlling means, which is herein illustrated as an electrically operated drum-type field-controller FC. After the respective field-shunts have been connected into operation, the field-shunt resistances RS1 and RS2 are then progressively shorted out by successive controller-points 13, 15 and 17 for RS1, and 14, 16 and 18 for RS2, as the field-controller FC is moved from its initial full-field position FF, through its intermediate positions F1, F2 and F3, to its shunted-field position SF, at which point the field-winding currents are reduced to about fifty percent of their unshunted values.

During dynamic braking, the braking-switch B1 connects the two motors through the common dynamic-braking circuit-connection X3 to X7, which contains a five-part braking-resistance R5 which is not a part of the motor-accelerating circuit. This resistance R5 is used, in addition to the previously mentioned accelerating-resistances R2 and R3, in establishing the complete dynamic-braking circuits. The braking-resistance R5 is progressively reduced or shorted out by means of braking-switches B2 to B5, during the dynamic-braking operation, after which the acceleration-resistances R2 and R3, or portions thereof, are progressively shorted out, as by the switch-contacts S1, S2, S7 and S8, in alternate-notching steps.

The progressive operation of the various resistance-shorting switches, during both motoring operation and dynamic braking, is under the automatic control of a suitable limit-relay or relays, which are energized to be responsive to conditions which accompany current-increments in the motors. Such a limit-relay is illustrated, in Figs. 1A and 1B, in the form of the previously mentioned current-relay CR, which, according to one form of embodiment of my present invention, is provided with the previously mentioned series coil CR, a kick-coil KC2, and a rate-coil RC, all acting cumulatively to cause a relay-response. The series coil CR is a one-turn current-coil which is serially connected between the points X1 and W1 in the first motor-circuit. The kick-coil KC2 is a multiturn shunt relay-coil which is connected in shunt across the terminals FT′ and X2 of the series main-field winding SF2 of the second motor, with a variable resistor R12 connected in series with said kick-coil KC2 for recalibrating purposes, as will be subsequently described. The rate-coil RC is a multiturn battery-energized coil which is controlled in a known manner, for recalibration purposes, as will be subsequently described.

This limit-relay CR has a back-contact 193 (also marked CR), which is normally closed, that is, which is closed in the non-actuated or low-current position of the relay.

All of the electrically controlled relays and switches which are shown in the drawing are diagrammatically indicated as having vertical switch-stems (indicated by dotted lines), which are biased by gravity toward their lowermost positions, and all of these relays and switches are shown in their deenergized or non-actuated positions. All of the relays and switches are electrically controlled, and they are illustrated as being electrically or magnetically operated, by means of an appropriately numbered or lettered coil or solenoid, represented by a circle, acting magnetically to lift an armature which is represented diagrammatically by a smaller circle inside of the coil-circle. In general, the same switch-designation is applied to any particular switch, its coil, and its contacts, by way of identification of the parts belonging to a given switch or relay.

The various electrical control-circuits for a train are under the control of a number of trainline wires, which extend from car to car, throughout the entire length of the train (not shown). In the simplified circuit-diagram of Figs. 1A and 1B, eight of these trainline wires are used, being given their usual designations, namely (+), 3, 4, 5, 6, 7, 12′ and GS.

Energy for the various relay-circuits or switch-circuits is provided by means of a battery B on each car. The negative terminal (−) of each battery is permanently grounded, while the positive terminal of each battery is connected through a switch 199, to the positive trainline wire (+).

Each end of each car is provided with a motorman's master controller MC, only one of which is indicated in the drawing. The illustrated master controller MC is indicated as being an accelerating-controller having an off-position and three on-positions 1, 2 and 3. In each of the three on-positions of the master-controller MC, the positive control-wire (+) is connected to the trainline wires 12′, GS and 6. In the second and third on-positions of the accelerating-drum of the master controller MC, the trainline wire 4 is energized from the positive bus (+); while in the third on-position of this controller, the trainline wire 7 is energized from the positive bus (+). In the off-position of the accelerating drum or master controller MC, a connection is made from the positive control-wire (+) to the trainline wire 3. In the master controller MC, the contact make and break points are so arranged that, during the notching-off of the master-controller, the contact at 3 is made, and the contact at GS is broken, before the contact at 12′ is broken.

The first on-position of the accelerating-controller MC, in Fig. 1A, is a switching position, in which the control-wires 12′, GS, and 6 are energized.

The control-wire 12′ energizes an exciting-circuit which first extends through the operating-coil LS1 of the line-switch LS1, then extends through a make-contact 200 of a line-relay LR, a make-contact 201 of an auxiliary, so-called door-brake, relay DB, a connection-wire 19, then back-contacts 202, 203, 204 and 205 of the switches B1, B4, M and S7, respectively, and finally the negative bus or battery-terminal (−). The line-switch LS1 has a hold-circuit make-contact 206 which bypasses the contacts 204 and 205, through the conductors 20 and 21, when this line-switch is actuated.

The line-relay LR is a known voltage-responsive relay which drops out upon a voltage-failure of the supply-line 197. This line-relay LR is shown as an undervoltage relay which has an operating-coil LR which is connected between the supply-line 197 and ground, through a back-contact 207 of the line-switch LS2, said back-contact 207 being paralleled by a make-contact 208 of the line-relay LR. This line-relay LR thus drops out in the event of a power-line voltage-failure, which might result from either a third-rail gap or from any other cause.

The trainline wire GS is shown, in Fig. 1A, as first energizing the operating-coil DB of the so-called door-brake relay DB, in series with a make-contact 209 of the line-relay LR. This door-brake relay DB is a novel feature of my present invention. In the form shown, it is provided with a back-contact 210 (see Fig. 1B), which is closed either if the line-relay LR drops out or if the trainline wire GS is deenergized.

The trainline wire GS also has a second branch, which energizes the operating-coil G1 of the ground-switch G1, through interlocks which are provided by back-contacts 211 and 212, which are carried by the braking-switch B1 and by the parallel-operation switch G, respectively. The back-contact 212 is bypassed or paralleled by a make-contact 213 of the ground-switch G1.

The trainline wire 6 is connected, through an LS1 make-contact 214, and a G1 make-contact 215, to a circuit 62 which constitutes a hold-circuit for the switch-progression for the accelerating-resistance short-circuiting switches S1 to S8 and J. This hold-circuit 62 is also used to energize the operating coil JR of the series-motor-circuit switch JR, through back-contacts 216 and 217 of the transition-switch J and the parallel-connection switch G, respectively. The said hold-circuit 62 is also used to directly energize the close-coil or actuating-coil BP-close of a known braking-operation protective-relay BP.

The result of the master-control energization in the No. 1 on-position of the master-controller MC, is thus to close the main-circuit or power-circuit contacts of the traction-motor switches LS1, G1 and JR, thereby completing a series-connection motor-circuit for causing a slow movement of the train, for so-called "switching" purposes, with all of the accelerating-resistances in series with the motors. This circuit can be traced from the supply-circuit 197, through the main LS1 contact, the resistor R1, the motor-armature A1, the series coil CR of the limit-relay, the series field SF1, the resistance R2, the resistance R4, the main JR contact, the resistance R3, the series field SF2, the motor-armature A2, and the main G1 contact, to ground.

At the same time, the energization of the braking-operation protective-relay BP paves the way for the subsequent energization of the dynamic-braking circuits of the motors, and also for the automatic progression-control, under the control of the limit-relay or current-relay CR, both for the motoring progression during acceleration, and for the dynamic-braking progression during an application of a brake-lever 218 (Fig. 1B), which is connected to the trainline wire 3, as shown in Fig. 1B, as will be subsequently described.

The hold-circuit 62 (Fig. 1A), which is energized in the No. 1 on-position of the master-controller, is also connected, through an LS1 make-contact 219, to a hold-circuit 67, which is used in the subsequent progression-control.

The No. 2 position of the accelerating-controller MC is the first of two running-positions 2 and 3. It initiates the accelerating progression of the series-motor connections, by energizing the trainline wire 4, which is connected, through an LS1 make-contact 220, to a conductor 45. The conductor 45 is connected, through the CR limit-relay back-contact 198, a conductor 45', and a BP make-contact 221, to a circuit 46, which constitutes the main limit-relay progression-circuit of the control-equipment. This limit-relay progression-circuit 46 is thus not only under the control of the limit-relay or current-relay CR, which is responsive to excessive motor-currents, but it is also under the control of the braking-operation protective-relay BP, which must be closed (with the protective relay in its actuated position), before there can be any progression during either the motoring operation or the braking operation.

This limit-relay progression-circuit 46 is connected, through an LS1 make-contact 222, to a progression-wire 47, which is connected, through an LS2 back-contact 223, and a JR make-contact 224, to a conductor 42, which energizes the operating-coil LS2 of the second line-switch LS2, which acts as the first acceleration-progression switch, by short-circuiting the first accelerating-resistor R1 in the main motor-circuit. This LS2 switch has a make-contact 225 which picks up and serves as a holding-circuit contact between the circuits 19 and 42.

The progression-wire 47 is also connected through an LS2 make-contact 226 to a control-wire 50. The control-wire 50 energizes the circuit 53 of the operating-coil S1 of the resistor-shorting progression-switch S1, through a back-contact 227 of this same switch S1. From the coil S1, the circuit continues on, through a back-contact 228 of the switch S7, a circuit 109, and a back-contact 229 of the switch J, to the negative bus (−). The progression-switch S1 thus picks up and closes a holding-circuit make-contact 230, which energizes the circuit 53 from the hold-circuit 67.

The actuation of said resistance-shorting switch S1 also closes a make-contact 231, which energizes a circuit 153 from the progression-circuit 47, through a back-contact 232 of the next resistance-shorting switch S2. The energizing-circuit for this switch S2 extends from the conductor 153, through the operating-coil S2, to the circuit 109. The actuation of the switch S2 closes a make-contact 233 which establishes a holding-circuit for the conductor 153 from the hold-wire 67.

The actuation of said switch S2 also closes a make-contact 234, which completes a circuit from the progression-wire 47 to a back-contact 235 of the switch S7, a conductor 59, the actuating coil S7 of said switch S7, and the previously described wire 109. The actuation of this switch S7 also closes a make-contact 236 which establishes a holding-circuit for the conductor 59 from the hold-wire 67.

The actuation of said switch S7 also closes a make-contact 237 which connects the progression-wire 47 to a back contact 238 of the switch S8, a circuit 152, the operating-coil S8, and the wire 109. The actuation of this switch S8 also closes a make-contact 239 which establishes a holding-circuit for the circuit 152 from the hold-wire 67.

The actuation of said switch S8 also closes a make-contact 240 which connects the progression-wire 47 to a circuit 65, thence to the operating-coil J of the transition-switch J, a G-switch back-contact 241, and thence to the negative bus (−). The transition-switch J then closes its main or power-circuit contact J, which constitutes the last step in the series motor-connection for the traction-motors, cutting out the last accelerating-resistance R4. This transition-switch J has a make-contact 242 which establishes a holding-circuit from the hold-line 62 to the conductor 65. The previously described J-switch back-contacts 216 and 229 are opened, upon the energization of the transition-switch J, thus dropping out the initial series-connection switch JR, and the accelerating-switches S1 to S8.

It has long been customary to automatically adjust the calibration or setting of the limit-relay CR, in order to cause this relay to drop out in response to various accurately controlled desirable minimum motor-current values, during both the acceleration-progression and the dynamic-braking progression. This is conveniently done by various controls for the energization of the rate-coil RC of the limit-relay CR.

At the top of Fig. 1B, I have shown two previously known circuits for the rate-coil control or calibration. One such rate-coil circuit involves a weight-responsive rheostat WT, which is automatically adjusted according to the variable weight or live load carried by the car, so that the rate-coil RC is the most strongly excited during light-load conditions, thus reducing the minimum-current setting at which the limit-relay CR picks up and opens its back-contact 199. The circuit of said weight-responsive rheostat WT is traceable from the positive control-power line (+) through an LS2 make-contact 243, a resistance R13, the aforesaid weight-responsive rheostat DT, a conductor 192, a portion of a resistance R14, a conductor 95, and the rate-coil RC.

A second old or known rate-coil energizing-circuit for the rate-coil RC involves a braking-responsive rheostat BKG, which automatically operates, in a known way, from its zero-resistance position to its full-resistance position, and finally to an open-circuit position, at a rate which is dependent upon the degree of application of the brake-handle 218, as is shown, for example, in my Patent 2,669,679, granted February 16, 1954. This second rate-coil energizing-circuit is traceable from the positive control-power line (+) through a make-contact 244 of a subsequently described brake-relay BR, then to the aforesaid braking-responsive rheostat BKG, a conductor 92, and a portion of the resistance R14, the conductor 95 and the rate-coil RC.

The next circuit in Fig. 1B shows that the dropping-out of the initial series-connection switch JR opens a JR make-contact 245 which is connected between the hold-wire 67 and the full-field wire 34 of the field-controller FC. The purpose of this JR make-contact 245 was to make sure that the field-controller FC was in its full-field position FF during the series-motor acceleration, while the accelerating resistances R1 to R4 were being progressively short-circuited. The operation of the full-field wire 34 in controlling the position of the field-controller FC will be described subsequently.

The next circuit in Fig. 1B shows a connection from the positive control-power line (+), through the previously mentioned back-contact 210 of my new door-brake relay DB, to a make-contact 246 of the brake-protective relay BP, and thence to a circuit 3A which energizes a holding-coil, BP-hold, of this relay. The circuit 3A has a branch-circuit which leads, through an LS1 back-contact 247 and a control-circuit 31A, to a BP make-contact 248, and thence to a control-circuit 31B, which is connected through two G1 back-contacts 249 and 251, to circuits 31 and 33, the purpose of which will subsequently be described.

After the energization of the transition-switch J, the way is prepared for the next step in the acceleration of the traction-motors, which is accomplished by a movement of the master-controller MC to its No. 3 position, which is a parallel-motor running-position. As shown in Figs. 1A and 1B, this position 3 of the master-controller energizes the trainline wire 7, which is connected, through a back-contact 252 of the accelerating or resistance-shorting switch S7, and a make-contact 253 of the transition-switch J, to the previously mentioned circuit 31, which is in turn connected, through a JR back-contact 254, to a control-circuit 66 which energizes the operating coils M and G of the parallel-motor-connection switches M and G. As shown in Fig. 1A, these switches M and G thereupon connect the traction-motors in parallel, between the supply circuit 197 and ground, with the accelerating resistances R2 and R3 in circuit with the respective motors. The energization of the parallel-connection switch G opens its previously described back-contact 241 (Fig. 1A), which drops out the transition-switch J. The energization of the parallel-connection switch M closes a make-contact 255 (Fig. 1B), which cooperates with a G1 make-contact 256 to establish a holding-circuit from the hold-wire 67 to the control-circuit 66.

Responsive to the dropping-out of the transition-switch J, the back-contact 229 of this switch recloses, in Fig. 1A, and re-initiates the switch-progression of the resistance-shorting switches S1 to S8, through the circuits which have been previously described. This establishes the maximum armature-voltage conditions on the motors, and it completes the connections for the full-field parallel-connection operation of the traction-motors.

As soon as the last resistance-shorting switch S8 closes, it closes a make-contact 257 (Fig. 1B), which energizes a field-controller actuating-circuit from the progress-wire 47, said circuit extending from the contact 257 through an M-switch make-contact 258 and an LS2 make-contact 259 to the shunted-field wire 39 of the field-controller FC.

The shunted-field wire 39 of the field-controller FC energizes a shunted-field coil FC—SF (Fig. 1A), or other means which may be used to move the field-controller from its full-field position FF to its shunted-field position SF. This starts the progressive operation of the field-controller FC, and this operation may be brought about in any one of the several ways. In the illustrated form of embodiment, since the power for the shunted-field wire 39 is obtained from the progress-wire 47, which is under the control of the limit-relay CR as shown in Fig. 1A, the field-weakening progression of the field-controller FC progresses under the control of the limit-relay CR, until the shunted-field position SF is reached. This completes the connections for the shunted-field parallel-connection operation of the traction-motors, thus completing the acceleration-progression.

If, now, the master-controller MC of Fig. 1A is returned to its off-position, the car or train being now running at some speed, the master-controller will deenergize the trainline wires 12', GS, 6, 4 and 7, thereby deenergizing the power-switches LS1 and G1, the second line-switch LS2, the resistance-shorting switches S1 to S8, and the auxiliary door-brake relay DB. In Fig. 1B, the last battery-circuit (+)—3A—31A—31B, and thence the wires 31 and 33, are energized as a result of the closure of the DB back-contact 210, the LS1 back-contact 247, and the G1 back-contacts 249 and 251. The wire 31 energizes the circuit 66 of the parallel-motor switches M and G, causing these switches to close. The wire 33 leads through a B4 back-contact 260 to a circuit 81, which leads to the operating-coil B1 of the braking-switch B1, the circuit of which is completed through a wire 102, a B4 back-contact 261, a wire 104, a JR back-contact 262, and thence to the negative bus (−).

The closure of the main switches M, G and B1 in Fig. 1A completes the establishment of a weak coasting-operation dynamic-braking circuit-connection for the traction-motors, with all of the available resistances R5, R2 and R3 in circuit, making the total dynamic-braking resistance large enough so that the braking-force is usually quite weak, at moderate motor-speeds, thus permitting the train to coast, with little or no sensible or perceptible braking-effect.

A connection is also provided, for controlling the field-controller FC during the coasting-operation. In accordance with a known practice, I provide a circuit extending from the control-wire 33 (Fig. 1B), through a back-contact 263 of the brake-relay BR, to a control-circuit 32, and thence through the back-contact 264 of a spotting-relay SR, to the previously mentioned full-field wire 34 of the field-controller FC. The spotting-relay SR is a previously known relay, having an operating-coil SR (Fig. 1A), which is included in the common brake-circuit connection X7—X1, so that this relay is responsive to the braking-circuit current. Actually, the spotting-relay coil SR is connected across a small portion of the braking-resistance R5, as is shown in my Patent No. 2,669,679. The spotting-relay SR is adjusted to have a low-current pickup-value, so that it can hold the braking-circuit current to a small value suitable for spotting purposes, during the coasting operation of the traction-motors, as is well understood in the art.

The full-field wire 34 of the field-controller FC energizes a full-field coil FC—FF (Fig. 1A), or other means for causing the field controller FC to move or progress from its shunted-field position SF to its full-field position FF. This energization of the full-field coil FC—FF, under the control of the spotting relay SR, thus progressively adjusts the field-controlling means FC toward its full-field position, whenever the spotting-current becomes lower than the setting of the spotting relay SR.

In accordance with a known control-method, the spotting-relay SR has a make-contact 265 (Fig. 1B), which connects the circuit 32 to a circuit 36, which goes up to a field-controller contact-segment 266 (Fig. 1A), which is closed only during certain early points in the progressive movement of the field-controller FC from its full-field position FF toward its shunted-field position SF. This field-controller segment 266 is preferably opened at a certain point near the shunted-field position SF, preferably before the field-controller reaches this shunted-field position SF. As shown, I prefer to have this field-controller segment 266 closed at the positions FF through F3 of the field-controller FC. This field-controller segment 266 is used to connect the wire 36 to the shunted-field wire 39 of the field-controller FC. In this way, when the spotting current is too large, that is, large enough to pick up the spotting-relay SR, the spotting current is reduced by adjusting the motor-fields toward a weaker condition, by making the field-controller FC progress in the direction towards its shunted-field position, but this progression is usually arrested before the field-controller returns all of the way back to its original shunted-field position SF, which it occupied before the spotting-control commenced to operate.

A service braking-application is made by the closure of the brake-lever 218 (Fig. 1B), which energizes the full-brake wire 5 from the brake-wire 3 when the master-controller MC is in its off-position. This full-brake wire 5 is connected directly to the coil BR of the brake-relay BR. The brake-relay BR has a make-contact 267, which connects the full-brake line 5 up to the conductor 45 (Fig. 1A), which leads to the limit-relay progression-circuit 46, thus putting the breaking progression under the control of the back-contact 198 of the limit-relay or current-relay CR, as well as under the control of the BP make-contact 221, both of which are in circuit between the conductor 45 and the limit-relay progression-circuit 46. At the same time, as shown in Fig. 1B, the opening of the back-contact 263 of the now-actuated brake-relay BR takes the braking progression out of the control of the spotting relay SR.

Whenever a braking-application is called for, the energization of the brake-relay BR (Fig. 1B), closes a BR make-contact 268, which is used to initiate the dynamic-braking progression by making a connection from the limit-relay progression-circuit 46 to the full-field wire 34 of the field-controller FC. This causes a movement of the field-controller FC until it reaches its full-field position FF, under the control of the limit-relay CR.

A BR make-contact 269 leads from the full-field wire 34 to a wire 49, which leads up to the field-controller FC in Fig. 1A; and when the braking-controlling progression has proceeded to the point at which full-field conditions are restored in the traction-motors, the field-controller FC closes a full-field contact-member 270, which closes a circuit from said wire 49 to a braking-progression circuit 48, which thus receives its energization under the control of the limit-relay back-contact 198, and thence through the circuits 46, 34 and 49 to said braking-progression circuit 48.

The closure of the brake-relay BR of Fig. 1B also closes a make-contact 271 which makes a connection from the control-wire 33 to a braking-operation hold-wire 71, in readiness for use in the subsequent progressive operation of the braking-switches B2 to B5. In accordance with one feature of my present invention, this BR make-contact 271 is bypassed by a B5 make-contact 272, for a purpose which will be subsequently described.

Upon the closure of the limit-relay back-contact 198 in Fig. 1A, the energization of the braking-circuit progression-wire 48 immediately serves, through a B1 make-contact 273 (Fig. 1B), which is already closed, to energize a circuit 72, which is connected, through a B2 back-contact 274, to a circuit 82 which is connected to the positive terminal of the B2 actuating-coil, the negative terminal of which is connected to the previously described conductor 102. The braking-switch B2 thus picks up and closes its main contact B2 (Fig. 1A), which shorts out a part X2—X6 of the braking-resistance R5 in the common dynamic-braking circuit X7—X1 of the traction-motors. The actuation of the B2 switch also closes a make-contact 275 (Fig. 1B), which establishes a holding-circuit for the wire 82 from the hold-wire 71.

Subject to the limit-relay back-contact 198 in Fig. 1A, a circuit is next established in Fig. 1B, from the progression-wire 48, through a B3 back-contact 276 and a B2 make-contact 277, which has just been closed, to a conductor 83 which is connected to the positive terminal of the B3 actuating-coil, the negative terminal of which is connected to the previously mentioned wire 102. The braking-switch B3 closes its main-circuit contact B3 (Fig. 1A), which shorts out more of the braking-resistance R5, at X7—X5 in the common dynamic-braking circuit X7—X1 of the traction-motors. At the same time, the B3 switch closes a make-contact 278 (Fig. 1B), which establishes a holding-circuit from the hold-wire 71 to the conductor 83.

A second circuit-connection is also provided, between the conductors 102 and 104, by means of a B5 make-contact 279, which, when it closes, bypasses the B4 back-contact 261.

Again subject to the limit-relay back-contact 198 of Fig. 1A, a circuit is next established in Fig. 1B, from the progression-wire 48, through a B5 back-contact 280, to a circuit 75, and thence through a B3 make-contact 281, which has just been closed, to a conductor 86 which is connected to the positive terminal of the B4 actuating-coil, the negative terminal of which is connected to the previously mentioned wire 104. As shown in Fig. 1A, the braking-switch B4 shorts out more of the braking-resistance R5, at X2—X4; and at the same time the B4 back-contact 261 opens, in Fig. 1B, and deenergizes the braking-switches B1, B2 and B3; while a B4 make-contact 282 establishes a holding-circuit from the hold-wire 71 to the conductor 86.

Again subject to the limit-relay back-contact 198 of Fig. 1A, a circuit is next established in Fig. 1B, from the progression-wire 48 and the circuit 75, and thence through a B2 back-contact 283 and a B4 make-contact 284, both of which have just closed, to a wire 85, then through the B5 actuating-coil to the circuit 104. As shown in Fig. 1A, the braking-switch B5 reduces the braking-resistance R5 by connecting the points X7 and X3; and at the same time a B5 make-contact 285 in Fig. 1B establishes a holding-circuit from the hold-wire 71 to the conductor 85.

The actuation of the B5 switch also closes a make-contact 286, which connects the progression-wire 48 to the previously described conductor 72, thereby reenergizing the B2 switch, the negative circuit of which is now completed from the wire 102, through the B5 make-contact 279, to the wire 104. The B2 make-contact 277 then again energizes the B3 switch. Another connection is provided from the progression-wire 48, through a B1 back-contact 287 and a B3 make-contact 288, both of which are now closed, to the wire 81 which energizes the B1 switch, thus reducing the braking-resistance R5 of Fig. 1A to its minimum value. A holding-circuit for the B1 coil is now provided in Fig. 1B, from the hold-wire 71, through a B1 make-contact 289 and a B5 make-contact 290, to the wire 81.

It will be understood that all of these braking-progression operations are under the control of the limit-relay progression-circuit 46 (Fig. 1A), which interrupts the progression whenever an excessive motor-current causes an opening of the current-relay back-contact 199, which is connected in the energizing circuit for said wire 46, thus interrupting the progression until the motor-current subsides to a desirable value.

A connection is also made, in Fig. 1B, through a BR make-contact 291, from the braking-operation hold-wire 71 to the hold-wire 67 which is used, in Fig. 1A, in the progressive alternate-notching control of the switches S1 to S8 which short out portions of the accelerating resistances R2 and R3.

As shown at the bottom of Fig. 1B, the braking-circuit progression-wire 48 is also connected, through a G1 out-contact or back-contact 292, to the accelerating-resistance progression-wire 47 of Fig. 1A, for reenergizing the progression-initiating wire 50, of the first resistance-switch S1, at a suitable point in the dynamic-braking progression. Thus, after the second closure or actuation of the B1 switch, so that the B1 and B5 switches are now both closed, a circuit is made, as shown in Fig. 1A, from the accelerating-resistance progression-wire 47, through a B1 make-contact 293 and a B5 make-contact 294, to the previously described conductor 50, thus reinitiating the progression of the switches S1 to S8 which progressively cut out the accelerating resistors R2 and R3 which are in the individual portions of the respective dynamic-braking circuits of the traction-motors, this progression being also under the same limit-relay control. The braking-progression thus continues until substantially all of the braking-resistance is removed from the dynamic-braking circuit, thus resulting in the completion of the dynamic-braking operation, during which time the speed of the car or train has been reduced from the initial speed at which the dynamic brake was applied, down to a low speed at which the dynamic brake fades out.

It is usually necessary to provide some means whereby a partial brake-application may be released or discontinued, without having to be continued through to brake-fade-out, after having been once started. In accordance with a known means for this purpose, the braking-circuit switches are released, by an opening of the brake-handle 218 (Fig. 1B), without requiring even a momentary establishment of a power-circuit (or MC on-position in Fig. 1A) in order to deenergize the braking hold-wire 71 in Fig. 1B. This is accomplished by the BR make-contact 271, which is in series with the braking-operation hold-wire 71. The opening of the brake-handle 218 deenergizes the brake-relay BR and opens its aforesaid make-contact 271, thus deenergizing the hold-wire 71; without requiring an on-position of the master controller MC in Fig. 1A, for the purpose of energizing the line-switch LS1, so that the LS1 back-contact 247 could deenergize the conductors 31A and 33, and hence deenergize the hold-wire 71 in Fig. 1B.

However, the sudden complete release of dynamic braking, when the car or train is still traveling fast, is often uncomfortable for the passengers, because the braking-power is high when the motors are operating at a high speed and are hence delivering a high armature-voltage at a braking-current which is held more or less constant by the limit-relay CR during the dynamic-braking operation. According to one feature of my present invention, therefore, I provide the proviously mentioned B5 make-contact 272 (Fig. 1B), which bypasses the BR make-contact 271 (or otherwise kills the brake-releasing means), until the braking-progression has proceeded far enough to cut out a substantial portion of the resistance R5 of the common braking-circuit X7—X1 in Fig. 1A, as indicated, for example, by an energized condition of the braking-switch B5. When the braking-progression has proceeded this far, the motor-speed, and hence the motor-voltage and the braking-power, will have been reduced enough so that a brake-releasing operation may be made without danger or extreme discomfort to the passengers. It is desirable to permit a brake-releasing operation as quickly as possible, as otherwise the car or train would have to be brought almost to a standstill every time the operator makes a precautionary brake-application when he is in doubt as to clearness of the track ahead.

The operation of the simplified illustrated apparatus will be clear from the running comments which have been made during the progress of the description, as well as from Patent 2,748,335, which issued to Frank H. Fowler and myself on May 29, 1956. A few words of added explanation, as to certain features which are more particularly related to my novel control-circuit parts, may, however, be helpful.

It will be noted that my present invention uses staggered resistance-notching, wherein the accelerating-resistance switches S1 to S8 are operated alternately, so that portions of the accelerating-resistances R2 and R3 are cut out alternately, first in one motor-circuit and then the other, as distinguished from operating the accelerating-resistance switches in pairs. When such staggered or alternate notching is used, it is desirable to provide a limit-relay means which is responsive to the sudden current-changes which are produced each time one of these staggered switching-operations is made; and my invention broadly contemplates any means for accomplishing this general purpose. In the form of embodiment of my invention which is shown in Figs. 1A and 1B, a single limit-relay CR is used, which is provided with a series current-coil CR in the first motor-circuit, while a transiently responsive kick-coil KC2 is used to respond to current-conditions in the second motor-circuit. This kick-coil KC2 is shown as being connected in shunt across the series field-winding SF2 in the second motor-circuit, so as to receive an extra kick or voltage-increment, due to the field-winding reactance, each time the motor-current is suddenly changed.

It will be understood, of course, that, in the broader aspects of my invention, the kick-coil KC2 may be regarded as being representative of any equivalent means for responding transiently to the rate-of-change of the motor-current, such as the ferromagnetic kick-coil of Patent 2,653,284, which issued to William L. Barclay and myself on September 22, 1953.

It will be understood, also, that any other equivalent transient current-responsive means might be used, for giving the limit-relay means an increment of excitation, and preferably a transient increment or kick, when the successive alternate notching or switching operations are being performed. This control of the limit-relay means is not limited to the use of any particular number of operating-coils on the limit-relay, but the several increments in the excitation of the limit-relay means may be accomplished in any manner, or by any means, which will accomplish the intended purpose. Accordingly, it is intended that my illustration of the series current-coil CR and the kick-coil KC2, in Fig. 1A, shall be understood to be symbolic or representative of any means for accomplishing the stated purposes, at least in the broader aspects of my invention.

The purpose of a limit-relay, such as CR in Figs. 1A and 1B, is to hold the motor-current substantially constant, at desired current-levels, during both series and parallel motor-operation, and during dynamic braking, including reduced-field operation during both motoring and braking. Necessarily, there must be some small changes or notchings in the motor-current, due to the practical necessity for making a certain finite number of switching-operations for bringing about the desired sequential motor-operation or control. The use of staggered or alternate notching doubles the number of motor-circuit changes which can be made with any given number of accelerating-resistance switches or switch-contacts S1 to S8.

The limit-relay CR is intended to pick up its back-contact 198 each time there is a switching-operation which results in an increase in the motor-current, and this back-contact 198 delays the next sequential switching-operation until the motor-current has subsided or again decreased to the desired preset level. In some cases, however, there is a tendency for the limit-relay to pick up its back-contact 198 too sluggishly, after a switching operation, thus permitting two or more sequential switching operations to be performed as quickly as the switching mechanism is capable of moving, without interruption for step-by-step operation as when the limit-relay picks up after each step; and this is where the kick-coil excitation is needed, in the limit-relay control. This kick-coil effect can be as simple (and inexpensive) or as elaborate as may be dictated by considerations of passenger-comfort, freedom from motor-flashing, or the available budget-allowance. I contemplate, in general, that any suitable kick-excitation means may be used, whether simple or elaborate, for accomplishing the purposes which have just been discussed.

During the first few notches of motor-acceleration, when the traction-motors are connected in series with each other, it is particularly necessary for the limit-relay to respond to each increment in the motor-current, in a manner which keeps the alternating resistance-switching operations under the control of the limit-relay, both for passenger-comfort and for the prevention of wheel-slippage. Also, during parallel-motoring operation, when the current in one motor-circuit is not affected by a notching-operation in the other motor-circuit, it is frequently desirable to have a limit-relay response which is associated with each one of the motor-circuits, and it is still generally desirable to use a suitable kick-coil energization of the limit-relay means. Also, during the dynamic-braking operation, and particularly during the initial stages thereof, it is quite necessary for some suitable kick-coil excitation to be used, in order to prevent a racing of the braking progression before the limit-relay means has a chance to pick up; and also, later on during the dynamic-braking operation, when the alternate-switching operations are being performed on the accelerating resistances R2 and R3, it is necessary, again, for the limit-relay means to have an excitation which is separately responsive to the currents in each of the motor-circuits.

In the form of embodiment of my invention which is shown in Fig. 1A, I provide means for controlling the strength of the kick-coil KC2 by varying its serially connected calibrating resistance R12, to distinguish between motoring-progression by progressively shorting out the accelerating resistances R2 and R3, and motoring-progression by progressive field-shunting; and also to distinguish between motoring-progression and braking-progression. When this calibrating resistance R12 is reduced or partially shorted out, the operating-force which is imparted to the limit-relay CR by the kick-coil KC2 is strengthened; and since the steady-state-responsive series current-coil CR is unchanged, this recalibration of the kick-coil KC2 increases the transient response of the limit-relay CR to sudden changes in the current in the traction-motor field-winding SF2, as compared with its steady-state response; and contrariwise when said calibrating resistance R12 is increased.

As shown in Fig. 1A, when the field-controller FC begins to move away from its full-field position FF, a field-controller contact-segment 295 completes a circuit between two wires 92 and Y2, thus shorting out some of the calibrating resistance R12 in the circuit of the kick-coil KC2, to compensate for the lower steady-state voltage-drop across the field winding during field-shunting, thus keeping the steady-state responsiveness of the limit-relay CR relatively unchanged. As has just been pointed out, however, this recalibration of the kick-coil KC2 increases the ratio of the rate-of-change response, as compared with the steady-current response, of the limit-relay CR; and this is of particular importance in dynamic braking.

To make the rate-of-change response stronger, during dynamic braking, than during the motoring-progression, I provide an LS2 back-contact 296 (Fig. 1A), which is closed due to the deenergization of the line-switch LS2 during dynamic braking, thus completing a circuit between the wire 92 and a wire Z2 of the resistance R12, and thus reducing the calibrating resistance R12 in series with the kick-coil KC2.

It will be noted that my limit-relay control is simple; it uses standard equipment without requiring additional apparatus; and each car, in a train of cars, functions individually.

Another novel feature of my present invention involves the use of my so-called door-brake relay DB, or its equivalent. In this connection, it will be noted that the master controller MC of Fig. 1A is so arranged that, when the controller is moving to its off-position, the GS contact breaks before the 12' contact. The breaking of the GS contact deenergizes the coil DB of the door-brake relay DB, dropping out this relay and closing its back-contact 210 (Fig. 1B), so as to energize the BP hold-coil from the battery-line (+), before the opening of the 12' contact deenergizes the line-switch LS1 and opens its make-contact 214, and this open contact 214 deenergizes the BP close-coil in Fig. 1A. In this way, I insure a continuity of energization of the brake-protective relay BP, so as to make possible a braking-operation by keeping the BP make-contact 248 closed in Fig. 1B.

It will be noted that the energization of the actuating-coil of my door-brake relay DB is also under the control of the make-contact 209 of the line-relay LR in Fig. 1A. Thus, if the third-rail power to any car fails for any reason, the line-relay LR drops out in that car, thus dropping out the door-brake relay DB, so that the DB back-contact 210 keeps the brake-protective relay BP energized in readiness for a braking-operation in Fig. 1B. If the train should stop with any car on a third-rail gap, the train can be moved, as heretofore, by the cars which are energized by the third-rail power, and the incapacitated car will begin its operation as soon as it passes the third-rail gap, as has heretofore been the case.

I have already discussed my means for killing the brake-release, in connection with the B5 make-contact 272, which I have added.

It will be understood that I am not limited to the precise illustrated details of control. For example, while I have shown a sequential motor-controlling progression-means, of a type which uses suitably interlocked individual switches for the control of the accelerating and braking resistances, and while I have shown a progressively moving multicontact control-means (such as the field-controller FC) for effecting the desired sequential switching-operations during shunt-field operation, I desire it to be understood that either type of sequential switching-means could be substituted, one for the other.

Furthermore, while I have shown a very simple limit-relay energization-means, which is economical and sensitive enough for many purposes, in effecting smooth operation, I am not limited to the precise details shown for this purpose, as has already been intimated.

Thus, as shown in Fig. 2, I could replace the series coil CR of the limit-relay CR in Fig. 1A, with a kick coil KC1, which is energized, preferably in series with a variable calibrating resistance R11, across the terminals of the series field winding SF1 of the first motor-circuit. I have also added a field-controller segment 297 and an LS2 back-contact 298, for controlling the wires Y1, 91 and Z1 of the resistance R11, in the same manner that the field-controller segment 295 and the LS2 back-contact 296 controlled the wires Y2, 92 and Z2 of the previously described resistance R12. The substituted kick-coil KC1, which is responsive to the first motor-circuit in Fig. 2, provides a much better transient response than the series coil CR of Fig. 1A, thus providing a somewhat smoother notching under the operation of the limit-relay CR, due to the better kick-coil action. This improvement is obtained, however, at the disadvantage of a somewhat greater difficulty in correlating the relative magnitudes of the transient and steady-state responses of the limit-relay CR, which can nevertheless be controlled, at least in most cases, by a suitable adjustment of the resistances R11 and R12 in Fig. 2.

In Fig. 3, instead of using one limit-relay CR, with energizing controls which are responsive to the motor-current conditions in both of the motor-circuits, I have illustrated the use of two limit-relays CR1 and CR2, for separately responding to the conditions in the respective motor-circuits. The first limit-relay CR1 of Fig. 3 is energized by a kick-coil KC1, as in Fig. 2, and a rate-coil RC1 of its own, and it is provided with a notching-controlling back-contact 198, as described in connection with Fig. 1A. The second limit-relay CR2 of Fig. 3 is energized by the previously described kick-coil KC2 and a rate-coil RC2 of its own, and it is provided with a notching-controlling back-contact 299. The two back-contacts 198 and 299 of Fig. 3 are serially connected, by a conductor 45″, between the conductors 45 and 45′ of Fig. 1A, so that the sequential operation is interrupted whenever either limit-relay CR1 or CR2 responds. The two rate-coils RC1 and RC2 of Fig. 3 are energized, in parallel with each other, from the circuit 95 of Fig. 1B.

The use of two separate limit-relays CR1 and CR2, as typified in Fig. 3, has the advantage of avoiding the use of heavy coil-insulation between two coils, of a single relay, which are connected to two different motor-circuits which have a considerable potential-difference between them. The construction of the two separate limit-relays CR1 and CR2 of Fig. 3 is somewhat simpler, and perhaps somewhat safer from the standpoint of possible trouble due to the use of such high voltage-differences in a single small compact relay.

In Fig. 4, I have shown a refinement of the single current-limit relay CR of either Fig. 1 or Fig. 2, although, here again, it is also possible to use two separate limit-relays CR1 and CR2 as discussed in connection with Fig. 3. In Fig. 4, I use somewhat stronger kick-coils KC1 and KC2 than in Fig. 2, but I partially buck the excitations of these respective coils by two bucking-coils CR1′ and CR2′ which are serially connected in the circuits in the respective motor-circuits. The purpose of these bucking series coils CR1′ and CR2′ in Fig. 3 is to partially cancel out the steady-current responses of the respective kick-coils KC1 and KC2, so as to emphasize the transient or rate-of-change responses, in comparison with the total effective steady-current responses of the limit-relay CR, as shown in the Patent 2,748,335 of Fowler and myself. This use of the bucking coils CR1′ and CR2′ has certain advantages and disadvantages, including the possibility of a more accurate notching-control which holds the motor-current variations between closer limits. It also usually makes possible the omission of the previously described resistances R11 and R12 of Fig. 2. It makes the limit-relay CR more sensitive to resistance changes, however, as the relay heats up.

Fig. 4 also shows the limit-relay CR as being provided with a known brake-coil BC, which assists in picking up the limit-relay with a force which is proportional to the amount of braking-current in the common braking-circuit portion X5—X1. In accordance with a known arrangement, this braking-coil is connected in parallel relation to the operating-coil SR of the spotting-relay SR, with a resistance R10 in series with the braking-coil BC.

While I have described my invention, and explained its manner of operation, in connection with a particular simplified illustrative form of embodiment, with several modifications, I wish it to be understood that the efficacy of the invention would not be affected by the addition of desired additional features or safeguards, or by the omission of undesired or unnecessary features, or by the substitution of equivalent or alternative forms of various means or elements for performing the essential element-functions which have been described and explained.

I claim as my invention:

1. A control-assembly for two direct-current series-motor means for a common load-device, each series-motor means including a motor-armature, and a series field winding; said assembly including: a separate accelerating resistance for each of the series-motor means; a motor-accelerating means for energizing said series-motor means, first in a series-motor connection and then in parallel-motor connection, with said separate accelerating resistances in series with their respective series-motor means, said motor-accelerating means including an alternate-notching means for progressively reducing first one accelerating resistances and then the other, in successive steps; a variable field-shunting means for progressively adjusting the series field windings toward a shunted-field condition in successive steps; a limit-relay means for delaying the progression in response to excessive motor-current conditions, said limit-relay means including a separate means for responding to the current in each of the series-motor means, at least one of said separate means including a response to the rate-of-change of the current in its series-motor means; and a means controlled by said field-shunting means for strengthening the rate-of-change response, in relation to the steady-current response, during shunted-field operating-conditions.

2. A control-assembly for two direct-current series-motor means for a common load-device, each series-motor means including a motor armature, and a series field winding; said assembly including: a separate accelerating resistance for each of the series-motor means; a motor-accelerating means for energizing said series-motor means, first in a series-motor connection and then in a parallel-motor connection, with said separate accelerating resistances in series with their respective series-motor means, said motor-accelerating means including an alternate-notching means for progressively reducing first one accelerating resistance and then the other, in successive steps; a dynamic-braking means for establishing two dynamic-braking circuits wherein the armature or armatures of each of said series-motor means are loaded by the field winding or windings of the other series-motor means in series with one of said accelerating-resistance means, said two dynamic-braking circuits including an amount of braking resistance which is not normally used in the motor-accelerating circuit, said dynamic-braking means including a braking-progression means for progressively reducing said braking resistance and for progressively reducing first one accelerating resistance and then the other, in alternate-notching steps; a limit-relay means for delaying the progression in response to excessive motor-current conditions, said limit-relay means including a separate means for responding to the current in each of the series-motor means, at least one of said separate means including a response to the rate-of-change of the current in its series-motor means; and a means responsive to the establishment of said dynamic-braking circuits for strengthening the rate-of-change response, in relation to the steady-current response, during dynamic-braking operating-conditions.

3. A control-assembly for two direct-current series-motor means for a common load-device, each series-motor means including a motor-armature, and a series field winding; said assembly including: a separate accelerating resistance for each of the series-motor means; a motor-accelerating means for energizing said series-motor means, first in a series-motor connection and then in a parallel-motor connection, with said separate accelerating resistances in series with their respective series-motor means, said motor-accelerating means including an alternate-notching means for progressively reducing first one accelerating resistance and then the other, in successive steps; a dynamic-braking means for establishing two dynamic-braking circuits wherein the armature or armatures of each of said series-motor means are loaded by the field winding or windings of the other series-motor means in series with one of said accelerating-resistance means, said two dynamic-braking circuits including an amount of braking resistance which is not normally used in the motor-accelerating circuit, said dynamic-braking means including a braking-progression means for progressively reducing said braking resistance and for progressively reducing first one accelerating resistance and then the other, in alternate-notching steps; a variable field-shunting means for progressively adjusting the series field windings in successive steps toward a shunted-field condition during the last stages of accelerating progression, and toward a full-field condition during the first stages of braking progression; a limit-relay means for delaying the progression in response to excessive motor-current conditions, said limit-relay means including a separate means for responding to the current in each of the series-motor means, at least one of said separate means including a response to the rate-of-change of the current in its series-motor means; and a means for recalibrating the limit-relay means to strengthen the rate-of-change response, in relation to the steady-current response, during reduced-field operating-conditions, and during dynamic-braking operating conditions.

4. A control-assembly for a direct-current motor having an armature and a series field winding; said assembly including: an accelerating resistance; a motor-accelerating means for energizing said motor-armature and said series field winding in series with said accelerating resistance, said motor-accelerating means including a means for progressively reducing said accelerating resistance in successive steps; a field-shunt for at times operating said motor with a reduced field, a field-controlling means for at times progressively changing said field-shunt in successive steps; a limit-relay means for delaying the aforesaid progressions in response to excessive motor-current conditions, said limit-relay means including a voltage-responsive means for obtaining a relay-response to the voltage across said series field winding; a calibrating resistance in series with said voltage-responsive means; and a means for reducing said calibrating resistance during reduce-field operating-conditions.

5. A control-assembly for two direct-current series-motor means for a common load-device, each series-motor means including a motor-armature, and a series field winding; said assembly including: a separate accelerating resistance for each of the series-motor means; a motor-accelerating means for energizing said series-motor means, first in a series-motor connection and then in a parallel-motor connection, with said separate accelerating resistances in series with their respective series-motor means, said motor-accelerating means including an alternate-notching means for progressively reducing first one accelerating resistance and then the other, in successive steps: a variable field-shunting means for progressively adjusting the series field windings toward a shunted-field condition in successive steps; a limit-relay means for delaying the progression in response to excessive motor-current conditions, said limit-relay means including a separate means for responding to the current in each of the series-motor means, at least one of said separate means including a voltage-responsive means for obtaining a relay-response to the voltage across the series field winding or windings of that series-motor means; a calibrating resistance in series with said voltage-responsive means; and a means for reducing said calibrating resistance during reduced-field operating conditions.

6. A control-assembly for two direct-current series-motor means for a common load-device, each series-motor means including a motor-armature, and a series field winding; said assembly including: a separate accelerating resistance for each of the series-motor means; a motor-accelerating means for energizing said series-motor means, first in a series-motor connection and then in a parallel-motor connection, with said separate accelerating resistances in series with their respective series-motor means, said motor-accelerating means including an alternate-notching means for progressively reducing first one accelerating resistance and then the other, in successive steps; a dynamic-braking means for establishing two dynamic-braking circuits wherein the armature or armatures of each of said series-motor means are loaded by the field winding or windings of the other series-motor means in series with one of said accelerating-resistance means, said two dynamic-braking circuits including an amount of braking resistance which is not normally used in the motor-accelerating circuit, said dynamic-braking means including a braking-progression means for progressively reducing said braking resistance and for progressively reducing first one accelerating resistance and then the other, in alternate-notching steps; a limit-relay means for delaying the progression in response to excessive motor-current conditions, said limit-relay means including a separate means for responding to the current in each of the series-motor means, at least one of said separate means including a voltage-responsive means for obtaining a relay-response to the voltage across the series field winding or windings of that series-motor means; a calibrating resistance in series with said voltage-responsive means; and a means for reducing said calibrating resistance during dynamic-braking operating-conditions.

7. A control-assembly for two direct-current series-motor means for a common load-device, each series-motor means including a motor-armature, and a series field winding; said assembly including: a separate accelerating resistance for each of the series-motor means; a motor-accelerating means for energizing said series-motor means, first in a series-motor connection and then in a parallel-motor connection, with said separate accelerating resistances in series with their respective series-motor means, said motor-accelerating means including an alternate-notching means for progressively reducing first one accelerating resistance and then the other, in successive steps; a dynamic-braking means for establishing two dynamic-braking circuits wherein the armature or armatures of each of said series-motor means are loaded by the field winding or windings of the other series-motor means in series with one of said accelerating-resistance means, said two dynamic-braking circuits including an amount of braking resistance which is not normally used in the motor-accelerating circuit, said dynamic-braking means including a braking-progression means for progressively reducing said braking resistance and for progressively reducing first one accelerating resistance and then the other, in alternate-notching steps; a variable field-shunting means for progressively adjusting the series field windings in successive steps toward a shunted-field condition during the last stages of accelerating progression, and toward a full-field condition during the first stages of braking progression; a limit-relay means for delaying the progression in response to excessive motor-current conditions, said limit-relay means including a separate means for responding to the current in each of the series-motor means, at least one of said separate means including a voltage-responsive means for obtaining a relay-response to the voltage across the series field winding or windings of that series-motor means; a calibrating resistance in series with said voltage-responsive means; and a means for reducing said calibrating resistance during reduced-field operating-conditions, and during dynamic-braking operating-conditions.

References Cited in the file of this patent

UNITED STATES PATENTS

| | | |
|---|---|---|
| 2,426,075 | Weybrew | Aug. 19, 1947 |
| 2,530,131 | Roters | Nov. 14, 1950 |
| 2,605,454 | Grepe | July 29, 1952 |
| 2,653,284 | Purifoy et al. | Sept. 22, 1953 |
| 2,669,679 | Purifoy | Feb. 16, 1954 |
| 2,669,681 | Purifoy | Feb. 16, 1954 |
| 2,748,335 | Purifoy et al. | May 29, 1956 |
| 2,806,194 | Lewis | Sept. 10, 1957 |